US008614675B2

(12) United States Patent
Rensberger et al.

(10) Patent No.: US 8,614,675 B2
(45) Date of Patent: Dec. 24, 2013

(54) AUTOMATIC MODE DETERMINATION FOR AN INPUT DEVICE

(75) Inventors: Gary Rensberger, Redmond, WA (US); Gene Robert Obie, Redmond, WA (US); Mike Franks, Seattle, WA (US); Vincent Ball, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1693 days.

(21) Appl. No.: 11/627,210

(22) Filed: Jan. 25, 2007

(65) Prior Publication Data

US 2008/0030470 A1 Feb. 7, 2008

(51) Int. Cl.
*G06F 3/033* (2013.01)
(52) U.S. Cl.
USPC .......................... 345/163; 345/166
(58) Field of Classification Search
USPC ................................ 345/156–172
See application file for complete search history.

(56) References Cited

U.S. PATENT DOCUMENTS

| | | | |
|---|---|---|---|
| 4,324,976 A | 4/1982 | Lapeyre | |
| 5,063,376 A | 11/1991 | Chang | |
| 5,457,480 A | 10/1995 | White | |
| 5,733,056 A | 3/1998 | Meagher | |
| 6,417,840 B1* | 7/2002 | Daniels | 345/158 |
| 6,466,154 B1 | 10/2002 | Kim | |
| 6,587,094 B2 | 7/2003 | Anderson | |
| 6,842,169 B2* | 1/2005 | Griffin et al. | 345/163 |
| 6,992,656 B2 | 1/2006 | Hughes | |
| 7,030,868 B2 | 4/2006 | Clapper | |
| 7,061,468 B2 | 6/2006 | Tiphane | |
| 7,091,949 B2 | 8/2006 | Hansen | |
| 7,113,173 B1 | 9/2006 | Bi | |
| 7,161,578 B1 | 1/2007 | Schneider | |
| 7,746,324 B2* | 6/2010 | Gates et al. | 345/169 |
| 2003/0067441 A1 | 4/2003 | Hamana | |
| 2003/0174125 A1 | 9/2003 | Torunoglu | |
| 2003/0201977 A1 | 10/2003 | Hassig | |
| 2005/0057508 A1 | 3/2005 | Kim | |
| 2005/0078087 A1* | 4/2005 | Gates et al. | 345/163 |
| 2005/0128180 A1* | 6/2005 | Wang | 345/156 |
| 2005/0179647 A1 | 8/2005 | Simmons | |
| 2005/0179658 A1* | 8/2005 | Huang et al. | 345/163 |
| 2005/0266872 A1 | 12/2005 | MacIntosh et al. | |
| 2005/0280632 A1 | 12/2005 | Tsan | |
| 2006/0197756 A1* | 9/2006 | Sun | 345/179 |
| 2006/0244726 A1* | 11/2006 | Wang et al. | 345/163 |
| 2007/0247427 A1* | 10/2007 | Huang et al. | 345/163 |
| 2008/0024448 A1* | 1/2008 | Chang | 345/166 |
| 2008/0030380 A1 | 2/2008 | Rensberger et al. | |
| 2008/0122791 A1* | 5/2008 | Hsu | 345/165 |
| 2009/0021483 A1* | 1/2009 | Hsu | 345/166 |

OTHER PUBLICATIONS

Amazon.com "Targus PAWM001U Wireless Optical Mouse/Pointer/Presenter: Electronics" http://www.amazon.com/Targus-PAWM001U-Wireless-Optical-Presenter/dp/B0001GU8MI/ref=dp_return_1/002-8183887-022—Nov. 4, 2006.

(Continued)

*Primary Examiner* — Alexander Eisen
*Assistant Examiner* — Nelson Lam
(74) *Attorney, Agent, or Firm* — Kelly, Holt & Christenson PLLC (57) ABSTRACT

Automatic mode determination for an input device is disclosed. Depending on conditions of the input device, the input device can transition from a first mode to a transition mode and/or a second mode.

17 Claims, 6 Drawing Sheets

(56) References Cited

OTHER PUBLICATIONS

Bi et al., "uPen: Laser-based, Personalized, Multi-User Interaction on Large Displays" Dept. of Computer Science, Tsinghua University, China 2005.

Wideaxis Technology "Wireless Control of your PowerPoint Presentations and a Laser Pointer in One Simple Device" http://www.venturaes.com/wideaxis/indexl.html, Nov. 20, 2006.

Cavens et al. "Interacting with the Big Screen: Pointers to Ponder" University of British Columbia, 2002.

Mini WirelessX-Pointer Wireles PowerPoint Presenation Controller, "Wireless Control of your PowerPoint Presentations and a Laser Pointer in One Simple Device!" http://www.venturaes.com/wideaxis/indexl.html.

"Remote control for computer presentations: Teaching & Learning Support Services: The . . . " University of Melbourne, http://www.infodiv.unimelb.edu.au/tss/access/keyspan.html, Nov. 2006.

Prosecution Documents associated with U.S. Appl. No. 11/627,214 including: Office Action mailed Mar. 8, 2010 Amendment filed Jun. 8, 2010 Office Action mailed Aug. 9, 2010 Amendment filed Sep. 21, 2010.

* cited by examiner

AUTOMATIC MODE DETERMINATION FOR AN INPUT DEVICE

BACKGROUND

There are a number of different input devices that interface with computing devices. These devices provide a mechanism for which a user can interact with a computer. Some of these input devices include remote controls, game controllers, mice, presenting devices, etc. Current input devices can perform one or more tasks for interfacing with a computer. These tasks include moving a cursor, selecting an icon, scrolling through a window, playing media files, and traversing through presentation slides.

The discussion above is merely provided for general background information and is not intended to be used as an aid in determining the scope of the claimed subject matter.

SUMMARY

Automatic mode determination for an input device is disclosed. Depending on conditions of the input device, the input device can transition from a first mode to a transition mode and/or a second mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
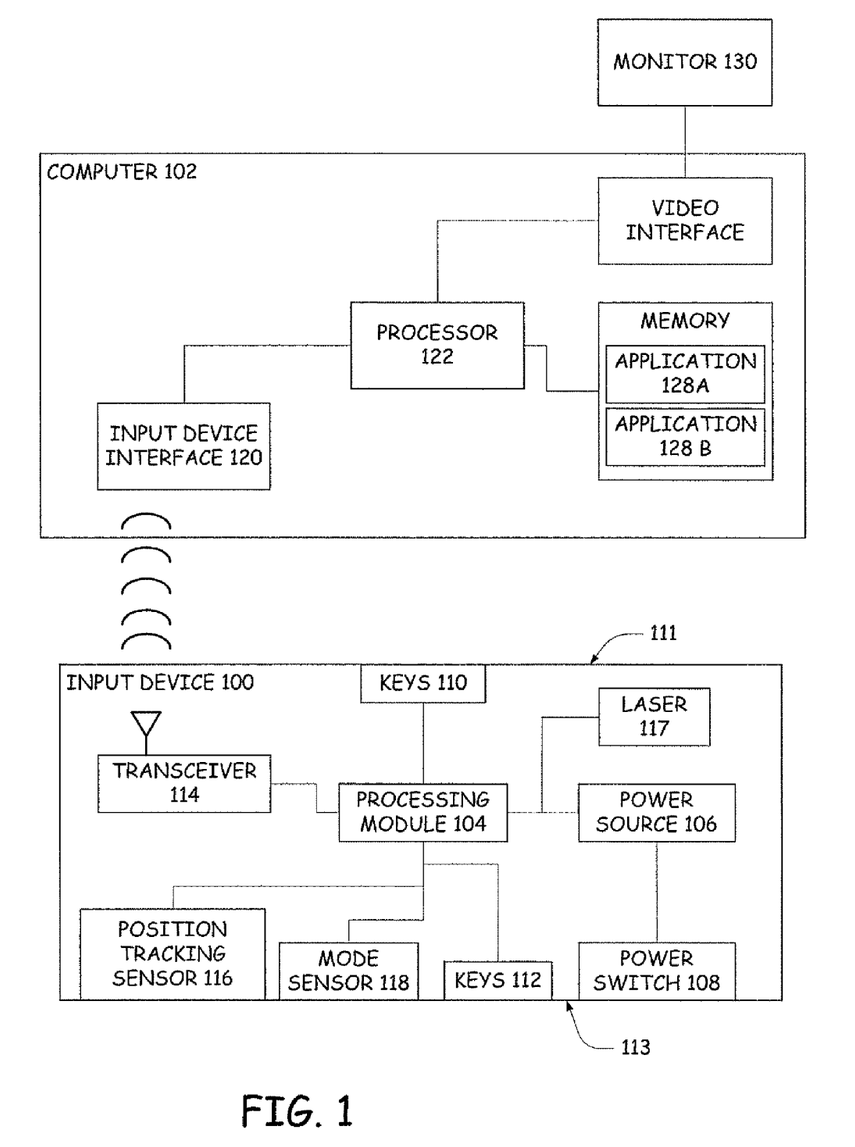
FIG. 1 is a schematic block diagram of an input device and a computer.

FIG. 1 is a block diagram of an input device 100 that interfaces with a computer 102. Input device 100 includes several components for interfacing with computer 102 to perform various tasks. Input device 100 includes a processing module 104 coupled to a power source 106. In one embodiment, power source 106 can include one or more batteries. Alternatively, a cable, such as a USB (Universal Serial Bus) cable, can connect to computer 102 or another power source to provide power to processing module 104. If desired, a power switch 108 can be provided on input device 100 to selectively power on and power off input device 100.

Input device 100 also includes a first set of keys 110 positioned on a top surface 111 of input device 100 and a second set of keys 112 positioned on a bottom surface 113 of input device 100. Keys 110 and keys 112 can be any form of input mechanism such as buttons, wheels, balls, switches, pads, etc. that can be actuated by a user. Although herein illustrated as having two sets of keys 110 and 112, device 100 can also include other keys as desired. Upon actuation of any of the keys 110 and keys 112, processing module 104 provides a signal indicative thereof to a transceiver 114. Transceiver 114 can be any type of wireless and/or wired communication module that transmits signals to computer 102. In one embodiment, transceiver 114 is a Bluetooth® compatible transceiver for wirelessly transmitting signals to and receiving signals from computer 102.

Input device 100 also includes a tracking position sensor 116, a laser 117 and a mode sensor 118. Position tracking sensor 116 can be any type of tracking sensor such as a track ball, optical sensor, etc. Relative movements of input device 100 or portions thereof correspond to movements of a cursor in a plane as detected by position tracking sensor 116. Transceiver 104 can send a signal indicative thereof to computer 102. Laser 117 generates a laser beam used in indicating points of interest, for example when giving a presentation. Such a laser is often referred to as a "laser pointer".

Mode sensor 118 can include one or more sensors for determining a particular mode of input device 100. In one example, mode sensor 118 can be a switch that is actuated by a user to switch from a first mode to a second mode. Alternatively, or in addition to, mode sensor 118 can sense a particular mode automatically, for example, through a pressure sensor, tilt sensor, electromechanical sensor, ultrasound sensor, capacitive sensor, infrared detection sensor, etc. Mode sensor 118 is operative with mode transition logic within processing module 104. Depending upon a particular mode for input device 100, keys 110 and/or keys 112 can be selectively enabled/disabled during operation of input device 100. For example, as discussed below, keys 110 can be enabled in a mouse mode and disabled in a presenter mode. Additionally, position tracking sensor 116 and/or laser 117 can be selectively enabled/disabled depending on the mode.

Computer 102 includes an input device interface 120 that receives signals from input device 100, in particular from transceiver 114. Additionally, computer 102 includes a processing unit 122, memory 124 and a video interface 126. Memory 124 can include one or more applications 128. Additionally, video interface 126 is coupled to a monitor 130 to display images thereon. By operating input device 100, a user can interact with any of the applications 128 and interact with monitor 130.

Figure 2:
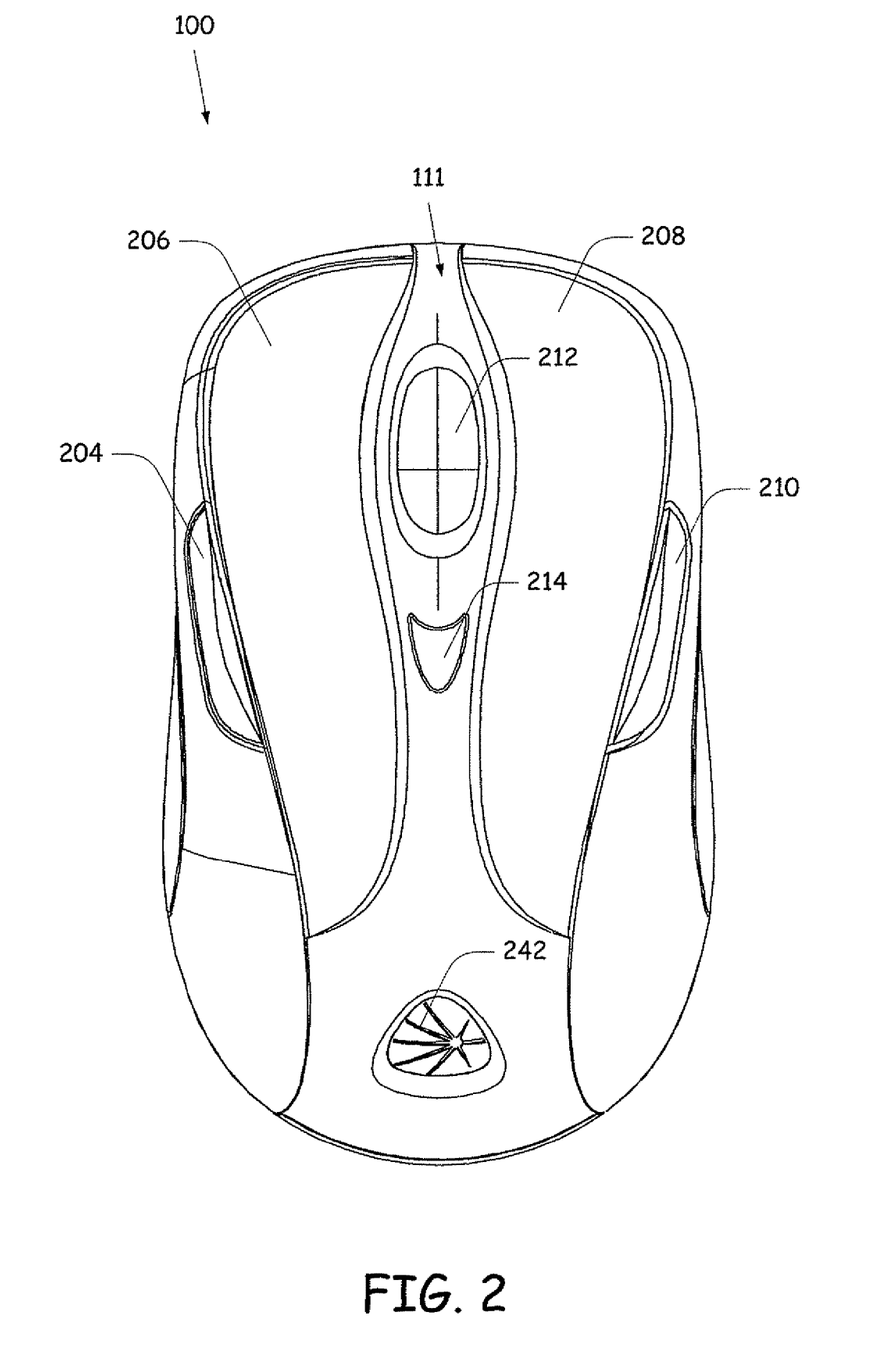
FIG. 2 is a top view of an input device.
Figure 3:
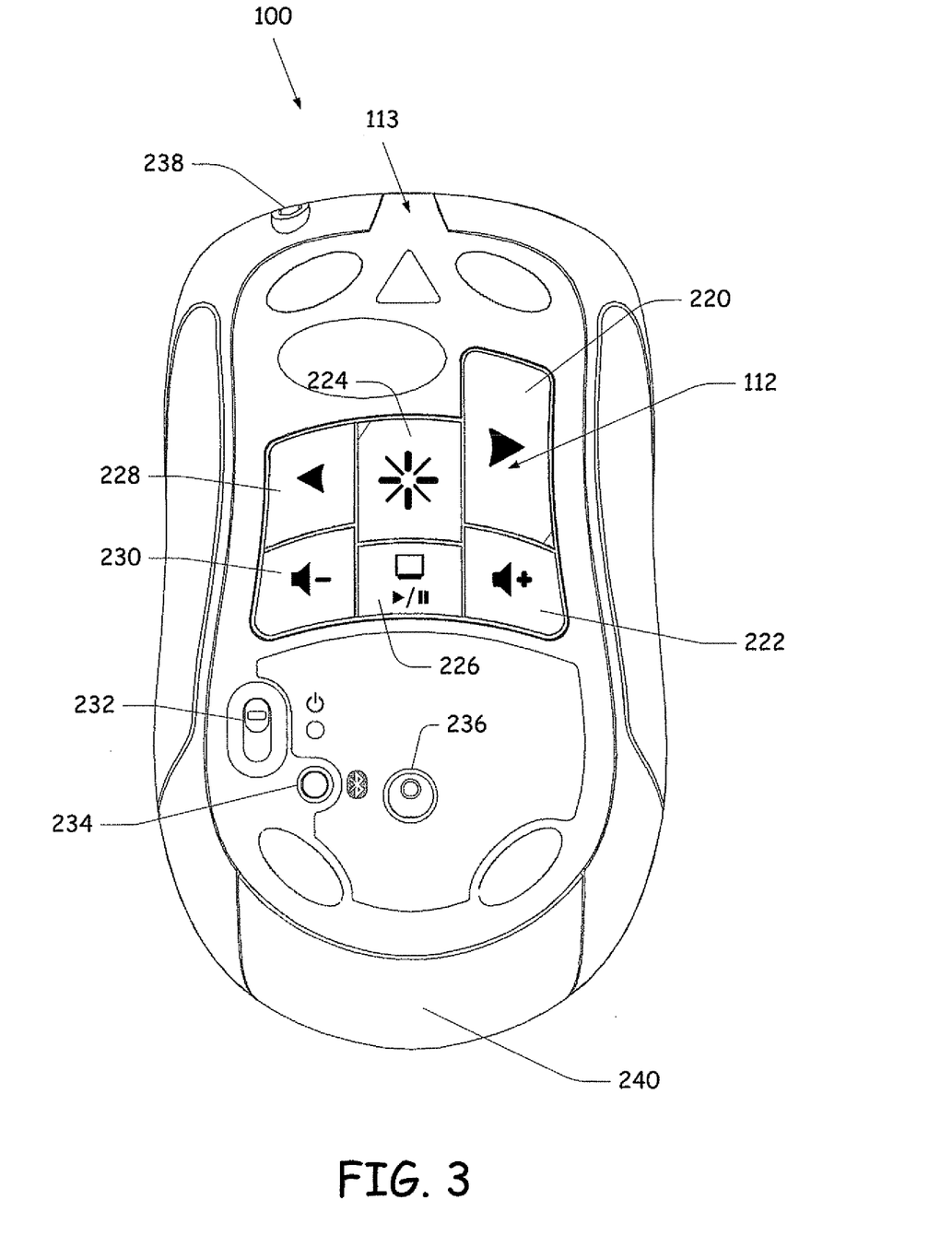
FIG. 3 is a bottom view of an input device.
Figure 4:
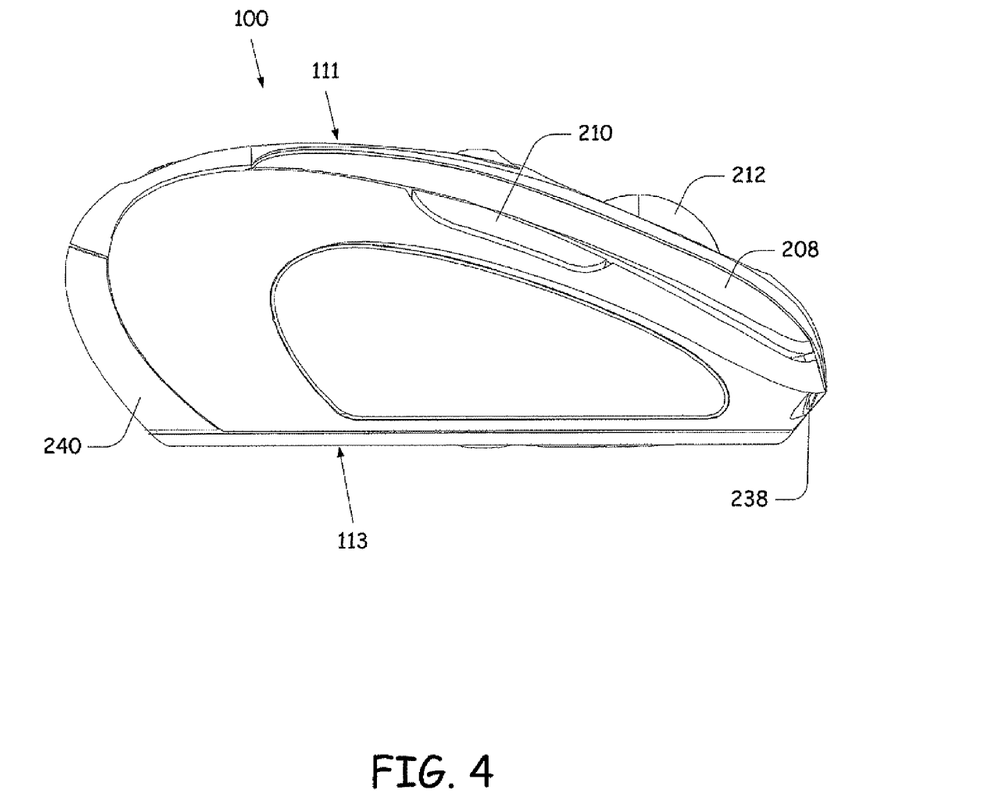
FIG. 4 is a side view of an input device.

FIGS. 2-4 illustrate different views of input device 100. Input device 100 includes top surface 111 (as seen in FIG. 2) and bottom surface 113 (as seen in FIG. 3). Positioned on top surface 111 are keys 110 that include a left side button 204, a left-click button 206, a right-click button 208 and a right side button 210. Top surface 111 also includes a scroll wheel 212 and a mode selection switch 214. Scroll wheel 212 can be used to scroll up/down as well as side/side. Keys 110 can be enabled in a mouse mode to operate as a conventional mouse.

Positioned on bottom surface 113 are buttons 220, 222, 224, 226, 228, and 230. Button 220 is illustrated as being larger than each of the other buttons 222, 224, 226, 228 and 230. During presentations, button 220 can be programmed to be used most frequently such as a next slide button. Additionally, button 224 can serve as a "home" button in the center of keys 112 such that a user can easily feel for button 224 without having to resort to looking at the keys 112. Keys 112 can be enabled in a presenter mode and can include several presentation functions. Button 220 can move a presentation to a next slide and button 228 can move the presentation to a previous slide. Button 224 can be used to operate laser 117 of FIG. 1. When button 224 is depressed, laser 117 outputs a beam through port 238.

Buttons 222, 226 and 230 can be used for media controls. In this case, button 222 serves as a volume up button, button 230 serves as a volume down button, and button 226 serves as a play/pause button. Alternatively, button 226 can serve as a blank screen button, which will turn a screen blank when depressed. It is worth noting that keys 110 (including buttons 204, 206, 208, 210 and wheel 212) and keys 112 (including buttons 220, 222, 224, 226, 228 and 230) can be programmed for any task as desired.

Additionally, surface 113 includes a power switch 232, a wireless transmission port 234, an optical sensor port 236 and a laser port 238. Input device 100 also includes a detachable portion 240 that can be released from input device 100 by actuating a release button 242. Detachable portion 240 can be removed from input device 100 to replace batteries, perform service and maintenance, etc.

Mode selection switch 214 is used to select a particular mode for which device 100 operates. Alternatively, or in addition to, mode selection can be performed automatically as a function of one or more conditions of input device 100. In one example, input device 100 can operate in a mouse mode and a presenter mode, although other modes can also be used. When in the mouse mode, surface 113 can rest on a flat surface such as a desk or table. In the presenter mode, device 100 can be held by a user wherein surface 113 is held upright and can be operated by a user's thumb.

In mouse mode, input device 100 operates as a standard mouse, in which keys 110 and position tracking sensor 116 are enabled. With reference also to FIG. 2, keys 110 can include buttons 204, 206, 208, 210 and wheel 212. Thus, a user has access to all keys 110 on surface 111. Keys 112 can be enabled at all times and be used to transition input device 100 to a presenter mode. When any one of keys 112 is depressed, input device 100 can switch to presenter mode automatically, where keys 110 and position tracking sensor 116 are disabled. Input device 100 can include a contour such that inadvertent pressing of one of keys 112 is prevented when input device is positioned on a surface and operating in the mouse mode.

Figure 5:
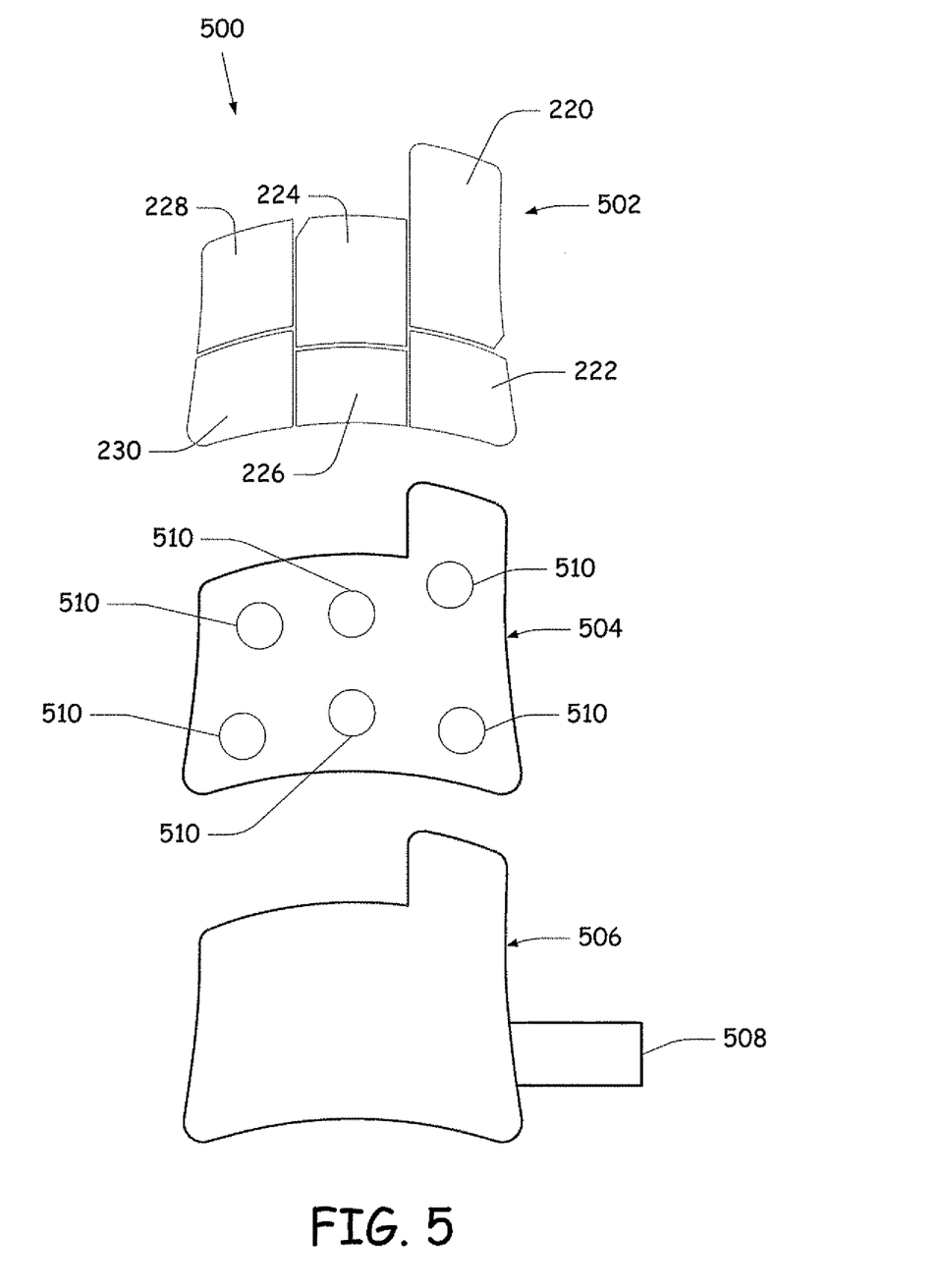
FIG. 5 is a view of a keypad for an input device.

As illustrated in FIG. 5, keys 112 can be integrated into a single keypad 500 that is coupled to a form factor of input device 100 and electrically coupled to processing module 104. Input device 100 can form a recess area to accommodate keypad 500. The recess can of sufficient depth to prevent inadvertent pressing of keys 112 in mouse mode yet still be accessible in presenter mode. Keypad 500 includes a pad 502, a matrix (herein a dome sheet) 504, an adhesive layer 506 and a connector 508. Pad 502 serves as a covering to dome sheet 504 and also indicates separate buttons 220, 222, 224, 226, 228 and 230. Dome sheet 504 carries dome contacts that includes switches 510 for each of the buttons. Dome sheet is electrically coupled to connector 508 such that dome sheet provides signals of actuation of any of the switches 510 along the connector 508. In one embodiment, connector 508 is a ribbon cable. Adhesive layer 506 secures keypad 500 to device 100. With reference also to FIG. 3, keys 112 can include buttons 220, 222, 224, 226, 228 and 230.

Figure 6:
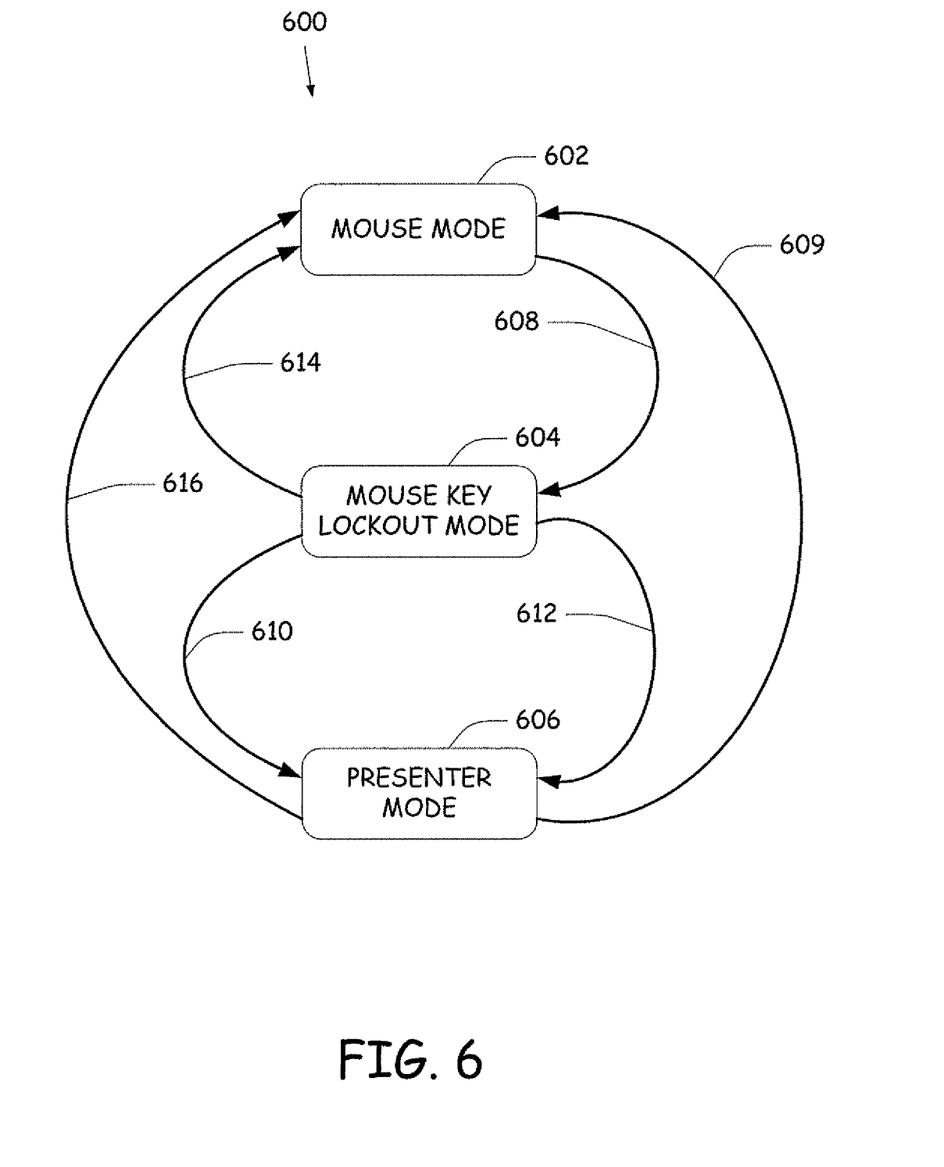
FIG. 6 is a state diagram of states for operation of an input device.

FIG. 6 is a state diagram of states for input device 100. State diagram 600 includes a mouse state 602 corresponding to a mouse mode, a mouse key lockout state 604 corresponding to a transition mode and a presenter state 606 corresponding to a presenter mode. When input device is powered on, input device begins at mouse state 602. In mouse state 602, all keys (i.e. keys 110 and 112) can be enabled. Alternatively, one or more of keys 112 can be disabled, but inadvertent pressing of keys 102 can be limited due to a shape of surface.

Depending on various conditions of input device 100, state diagram 600 shifts among states 600, 602 and 604. These conditions can relate to, for example, device 100 being positioned on/off a flat surface, a time that device 100 is off of a flat surface, a length of distance tracked by position tracking sensor 116 and/or whether particular keys on device 100 are pressed.

If it is detected that input device 100 is lifted off a surface, as indicated by arc 608, state diagram 600 shifts to mouse key lockout mode 604. These are several ways to detect whether device 100 is off a surface. For example, position tracking sensor 116, if optically based, can detect poor image quality since the tracking sensor 116 would not be able to detect strong reflections from a flat surface. Other sensors such as pressure sensors, capacitive sensors, tilt switches, etc. can also be used to detect whether device 100 is off of a surface. Additionally, pressing any of the keys 112 will automatically shift state diagram 600 from mouse state 602 to presenter state 606, as indicated by arc 609.

In mouse key lockout state 604, position tracking sensor 116 is still enabled and tracks a coordinate position for input device 100. Keys 110 are disabled and processing module 104 ignores any input from keys 110. There are two conditions for shifting state diagram 600 from state 604 to presenter state 606. If a presenter key is depressed, state diagram 600 immediately shifts to presenter mode 606 through arc 610.

If an off surface time period has been reached in mouse key lockout state 604, as represented by arc 612, state diagram 600 shifts to presenter state 606. For example, if position tracking sensor 116 still does not detect strong reflections after a period of time, it is likely that device 100 is being held by a presenter and device 100 can be shifted to a presenter mode.

State diagram 600 can shift from state 604 to state 602 along arc 614 if position tracking sensor only tracks a small movement of device 100. For example, a user may only temporarily shift device 100 to a new position while lifting the device 101 off a surface. In such a case, it is not necessary to transition to presenter mode 606 and thus state diagram 600 shifts from state 604 to state 602.

In presenter state 606, keys 110 enabled in the mouse mode are disabled. Thus, inadvertent pressing of keys 110 will not interfere with the presenter mode functions. State diagram 600 can shift from presenter state 606 to mouse state 602 via arc 616 in which position tracking sensor 116 senses a long position change of device 100. In such a case, a user is likely using device 100 in mouse mode and thus transition to mouse state 602 can be initiated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An input device, comprising:
   a first plurality of keys enabled when the input device is operating in a first mode in which the input device is positioned on a surface;
   a sensor enabled in the first mode and sensing movement of the input device along the surface and providing a sensor output indicative of the input device being moved along the surface and the input device being lifted off the surface;
   a second plurality of keys enabled when the input device is operating in a second mode and disabled when the input device is operating in the first mode;
   mode transition logic detecting conditions for transition from the first mode to the second mode based on the sensor output indicating that the input device is lifted off the surface wherein, prior to transitioning to the second mode, the mode transition logic places the input device in a transition mode in which the first plurality of keys are disabled, the sensor remains enabled and the second plurality of keys are enabled;

wherein, when the input device is in the transition mode, the mode transition logic places the input device in the second mode, from the transition mode, if the mode transition logic detects actuation of one of the second plurality of keys, and places the input device back in the first mode, from the transition mode, if the sensor output indicates that the input device is back on the surface and is being moved across the surface; and a processor, activated by the mode transition logic, to control operation of the input device in a mode that it is placed in by the mode transition logic.

2. The input device of claim 1 wherein the transition mode includes an associated time period such that the mode transition logic will transition the input device to the second mode after the time period as a function of detected conditions.

3. The input device of claim 1 wherein the sensor is an optical sensor adapted to detect whether the input device is positioned on a surface as a function of light detected by the optical sensor.

4. The input device of claim 1 wherein the first mode is a mouse mode and the second mode is a presenter mode and wherein the first plurality of keys are disabled in the presenter mode.

5. The input device of claim 1 wherein the first plurality of keys are positioned on a first surface of the input device and the second plurality of keys are positioned on a second surface of the input device, opposite the first surface.

6. The input device of claim 1 and further comprising a laser operably coupled to one of the second plurality of keys to such that a laser beam is generated when said one of the second plurality of keys is pressed.

7. An input device, comprising:
at least one mouse key enabled when the input device is in a mouse mode in which the input device is positioned on a surface;
a sensor operable in the mouse mode and sensing movement of the input device along the surface and providing a sensor output indicative of whether the input device is moving along the surface, and whether the input device is on the surface or off the surface;
a plurality of presenter keys enabled when the input device is in a presenter mode and used to navigate through a slide presentation; and
mode transition logic generating a mode indication indicating a mode of operation of the input device based on the sensor output, the mode transition logic indicating that the input device is in a transition mode if the sensor output indicates the input device is lifted off the surface, the mode transition logic indicating the input device is in the presenter mode if, while in the transition mode, one of the presenter keys is actuated, and the mode transition logic indicating the input device is in the mouse mode if, while in the transition mode, the sensor indicates the input device is on the surface; and
a processor, operating the input device in the mode indicated by the mode transition logic, and locking out operation of the at least one mouse key when the input device is in the transition mode.

8. The input device of claim 7 wherein the plurality of presenter keys form a keypad that is operably coupled to a matrix including a switch for each key in the plurality of presenter keys such that when one of the plurality of presenter keys is pressed, the corresponding switch is activated to provide a signal indicative thereof.

9. The input device of claim 8 wherein the second plurality of keys include a next slide key, a previous slide key and a laser key operably coupled to a laser.

10. The input device of claim 8 wherein the input device includes a recess to accommodate the keypad.

11. The input device of claim 7 and further comprising:
a wireless transceiver adapted to transmit wireless signals to a computer as a function of actuation of the first set of keys and the second set of keys.

12. The input device of claim 7 wherein at least one mouse key is disabled when the input device is in the presenter mode and when the input device is in the transition mode and wherein the at least one mouse key is positioned on a top surface of the input device and the plurality of presenter keys are positioned on a bottom surface of the input device, opposite the top surface.

13. A method of operating an input device, comprising:
operating the input device in a first mode of operation in which the input device is positioned on a work surface, wherein in the first mode of operation at least a first key on the input device and a sensor on the input device are enabled;
detecting a first condition of the input device indicating the input device is lifted off the work surface;
transitioning the input device to a transition mode from the first mode of operation upon detecting the first condition, wherein in the transition mode the first key is disabled, a second key is enabled, and the sensor is enabled;
detecting a second condition of the input device while the input device is in the transition mode, the second condition indicating that the second key is activated; and
transitioning the input device to a second mode of operation, from the transition mode, upon detecting the second condition wherein the first key and the sensor are disabled and the second key is enabled.

14. The method of claim 13 and further comprising:
positioning the first key on a first surface of the input device; and
positioning the second key on a second surface of the input device opposite the first surface.

15. The method of claim 13 and further comprising:
providing a plurality of mouse keys, including the first key, enabled in the first mode and disabled in the second mode; and
providing a plurality of presenter keys, including the second key, enabled in the second mode.

16. The method of claim 13 and further comprising:
providing a laser on the input device.

17. The method of claim 13 and further comprising:
providing a power switch for the input device.

* * * * *